United States Patent [19]

Sheridan

[11] Patent Number: 4,874,959
[45] Date of Patent: Oct. 17, 1989

[54] MARINE ENGINE WITH LOUVERED FLYWHEEL COVER SHROUD

[75] Inventor: Stephen E. Sheridan, Fond du Lac, Wis.

[73] Assignee: Brunswick Corporation, Skokie, Ill.

[21] Appl. No.: 176,608

[22] Filed: Apr. 1, 1988

[51] Int. Cl.$^4$ ............................................ H02K 5/20
[52] U.S. Cl. ...................................... 290/1 B; 310/89
[58] Field of Search ...................... 290/1 R, 1 A, 1 B; 310/89

[56] References Cited

U.S. PATENT DOCUMENTS

| | | | |
|---|---|---|---|
| 2,156,957 | 5/1939 | Aydelott | 290/1 B |
| 2,945,138 | 10/1963 | Kiekhaefer | 310/153 |
| 3,150,474 | 7/1960 | Strang | 123/59 |
| 3,719,843 | 3/1973 | Dochterman | 310/89 |
| 3,937,200 | 2/1976 | Sleder et al. | 123/148 CC |
| 4,093,906 | 6/1978 | Draxler | 322/51 |
| 4,160,435 | 7/1979 | Sleder | 123/148 CC |
| 4,325,350 | 4/1982 | Bauer et al. | 123/605 |
| 4,418,677 | 12/1983 | Hofmann | 123/599 |
| 4,647,835 | 3/1987 | Fujikawa et al. | 290/1 B |
| 4,684,835 | 8/1987 | Kline, Jr. et al. | 310/89 X |

FOREIGN PATENT DOCUMENTS 53-5346 1/1978 Japan ...................................... 290/1 B

OTHER PUBLICATIONS

Mercury Marine Parts Catalog 90-13292, Aug. 1985, pp. 6, 7, 22, 23, 28, 29.

Primary Examiner—William M. Shoop, Jr.
Assistant Examiner—W. E. Duncanson, Jr.
Attorney, Agent, or Firm—Andrus, Sceales, Starke & Sawall

[57] ABSTRACT

In a two cycle internal combustion outboard marine engine (10) having vertical crankshaft (12) extending upwardly through a crankcase (14) and an alternator stator (6), and having a flywheel (4) secured to the top of the crankshaft, a louvered flywheel cover shroud (30) is provided over the flywheel and alternator. The louvers are provided by a plurality of spaced ramps (50, 52, 54, 56) extending along spaced inclined planes and defining vent openings (36, 38, 40, 42) therebetween exhausting air, to cool the alternator.

7 Claims, 1 Drawing Sheet

MARINE ENGINE WITH LOUVERED FLYWHEEL COVER SHROUD

BACKGROUND AND SUMMARY

The invention relates to two cycle internal combustion marine engines having a vertical crankshaft extending upwardly through a crankcase and alternator, a flywheel secured to the top of the crankshaft, and a flywheel cover shroud over the flywheel and alternator.

Flywheel cover shrouds for the above noted marine engines are known in the prior art. The cover shroud protects the components thereunder, and also protects the boat operator from injury, particularly from the spinning flywheel during engine operation.

The present invention provides a louvered shroud with vent openings exhausting air, to cool the alternator. The louvers and openings are designed and positioned so that air may be exhausted, yet still provide safety from injury to the user.

DETAILED DESCRIPTION

Prior Art

Figure 1:
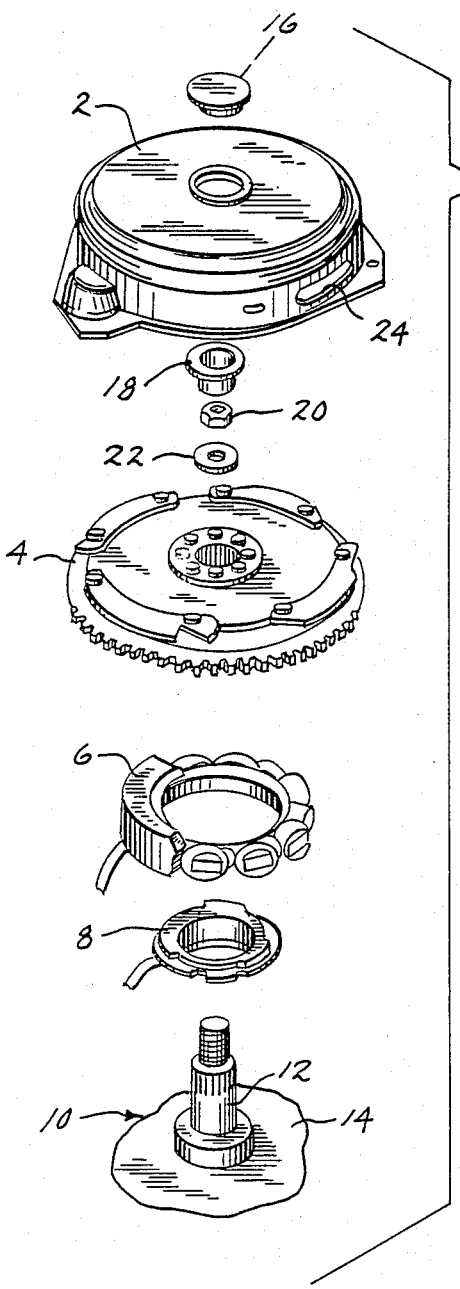
FIG. 1 is an exploded perspective view of a flywheel cover shroud and components thereunder as known in the prior art.

FIG. 1 shows a cover shroud 2 for a flywheel 4, alternator stator 6, and ignition trigger plate 8 of a two cycle internal combustion outboard marine engine 10 having a vertical crankshaft 12 extending upwardly through the crankcase 14, trigger plate 8 and alternator stator 6, all as is known in the art, and for which further reference may be had to U.S. Pat. Nos. 4,418,677, 4,325,350, 4,160,435, 4,093,906, 3,937,200, 3,150,474, 2,945,138, incorporated herein by reference and for example as shown in Mercury Marine Parts Catalog 90-13292, August 1985, pages 6, 7, 22, 23, 28, 29. FIG. 1 also shows the cover plug 16, and the flywheel plug 18, nut 20 and washer 22. Slot 24 in cover 2 is for the recoil starter rope. The engine is also typically provided with a starter motor (not shown) engageable with the teeth of flywheel 4.

Present Invention

Figure 3:
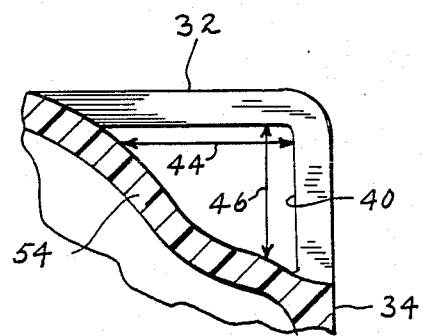
FIG. 3 is a sectional view taken along line 3—3 of FIG. 2.
Figure 2:
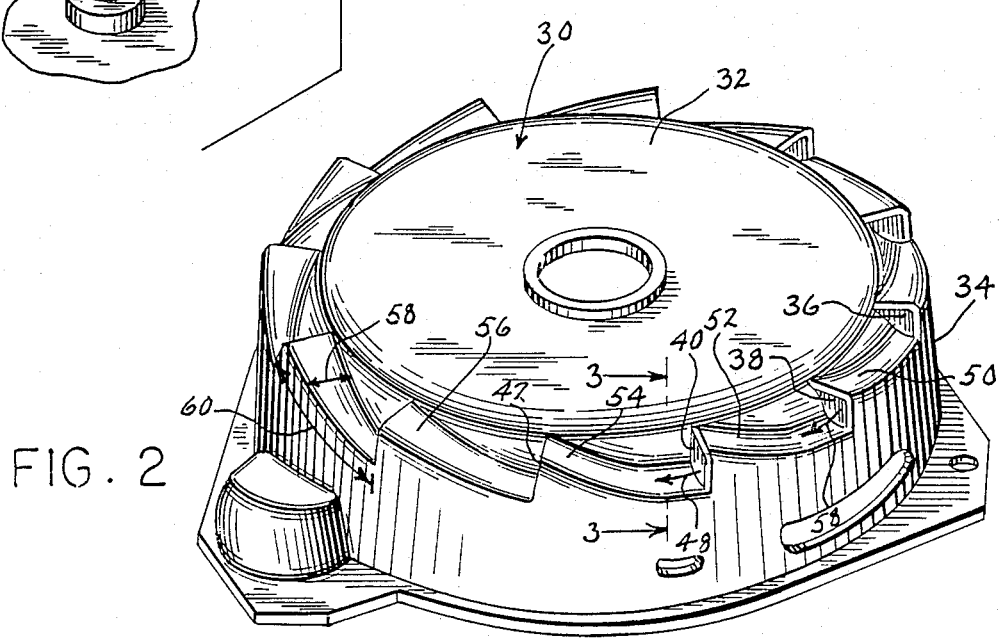
FIG. 2 is a perspective view of a flywheel cover shroud in accordance with the invention.

FIG. 2 shows a flywheel cover shroud 30 in accordance with the invention. Cover shroud 30 is an inverted dish-like member over the flywheel and alternator and is substantially identical to cover shroud 2 except that it is louvered along its upper perimeter to provide a plurality of vent openings exhausting air, to cool the alternator. Cover shroud 30 has a top circular wall 32 and a cylindrical side wall 34 extending downwardly from the outer perimeter of top wall 32. Vent openings 36, 38, 40, 42, etc. are formed in the cover shroud at the top of side wall 34 at the interface with top wall 32. Each opening has a width along direction 44, FIG. 3, and a height along direction 46 which extend in a substantially vertical plane which extends radially relative to crankshaft 12. Air flowing circumferentially along an arc within cover shroud 30 during rotation of the flywheel exits the cover shroud through opening 40 along a horizontal arcuate direction shown at arrow 48, perpendicular to the vertical radial plane of opening 40. Air exits the remaining openings in like manner.

Side wall 32 has a plurality of ramps 50, 52, 54, 56, etc., extending arcuately therearound. Each ramp extends from the bottom of one opening upwardly to the top of the next opening. For example, ramp 52 extends from the bottom of opening 38 to the top of opening 40. Air exiting opening 38 flows horizontally arcuately through opening 38 as shown at arrow 58, and then flows upwardly along the exterior of ramp 52. Air flowing arcuately within cover shroud 30 below opening 38 flows arcuately and upwardly along the interior of ramp 52, and then exits through opening 40, as shown at arrow 48. Air flow for the other ramps and openings is comparable.

Ramps 50, 52, 54, 56, etc. provide spaced louvers defining the noted openings such as 36, 38, 40, 42, therebetween, which exhaust air, to cool the alternator. The louvers provided by the ramps extend along spaced inclined planes. Air exits through openings 36, 38, 40, etc. and then flows along directions generally parallel to such inclined planes of the louvers. The louvers extend along such inclined planes into the arcuate air flow path within the cover shroud such that the openings intercept such arcuate air flow path. The ramps have widths 58 extending radially relative to crankshaft 12, and have length 60 extending arcuately and upwardly from the bottom of one opening to the top of the next opening.

It is recognized that various equivalents, alternatives and modifications are possible within the scope of the appended claims.

I claim:

1. In a two cycle internal combustion marine engine having a vertical crankshaft extending upwardly through a crankcase and alternator, and a flywheel secured to the top of the crankshaft, a flywheel cover shroud comprising an inverted dish-like member over said flywheel and said alternator, said cover shroud having one or more vents therein exhausting air, to cool said alternator, wherein said cover shroud has a top wall and an extending side wall, and said vents are formed by one or more openings in said cover shroud along an upper perimeter thereof, and said side wall is generally cylindrical and extends downwardly from the outer perimeter of said top wall, and wherein said openings are formed at the top of said side wall at the interface with said top wall, and wherein each of said openings has a width and a height extending in a vertical plane which extends radially from said crankshaft, such that air flowing circumferentially along an arc within said cover shroud exits said cover shroud through said opening by flowing along a horizontal arcuate direction perpendicular to said vertical radial plane of said opening.

2. The invention according to claim 1 wherein said side wall has a plurality of ramps extending arcuately therearound, each ramp extending from the bottom of one said opening upwardly to the top of the next opening, such that air exiting said one opening flows horizontally arcuately through said one opening and then upwardly along the exterior of said ramp, and such that air flowing arcuately within said cover shroud below said one opening flows arcuately and upwardly along the interior of said ramp and exits through said next opening.

3. In a two cycle internal combustion marine engine having a vertical crankshaft extending upwardly through a crankcase and alternator, and a flywheel secured to the top of the crankshaft, a flywheel cover shroud comprising an inverted dish-like member over said flywheel and said alternator and having a plurality of openings therein and a plurality of ramps extending arcuately therearound, each ramp extending from one side of one said opening along an incline to the opposite side of the next said opening, such that air exiting said one opening flows arcuately through said one opening and then along the exterior of said ramp, and such that air flowing arcuately within said cover shroud adjacent said one opening flows arcuately along the interior of said ramp and exits through said next opening.

4. In a two cycle internal combustion marine engine having a vertical crankshaft extending upwardly through a crankcase and an alternator, and a flywheel secured to the top of said crankshaft, a flywheel cover shroud comprising an inverted dish-like member over said flywheel and said alternator, said cover shroud having a plurality of spaced louvers defining openings therebetween exhausting air, to cool said alternator, wherein said louvers extend along inclined planes, and wherein air exits through said openings and then flows along directions generally parallel to said planes.

5. The invention according to claim 4 wherein said cover shroud has a top wall and a extending generally cylindrical side wall, and wherein during rotation of said flywheel air flows within said shroud along an arcuate path around the inner surface of said side wall, and wherein said louvers extend along said inclined planes into said arcuate air flow path such that said openings intercept said arcuate air flow path.

6. The invention according to claim 5 wherein said louvers have widths extending radially relative to said crankshaft, and have lengths extending arcuately and upwardly from the bottom of one opening to the top of the next opening.

7. In a two cycle internal combustion marine engine having a vertical crankshaft extending upwardly through a crankcase and alternator, and a flywheel secured to the top of the crankshaft, a flywheel cover shroud comprising an inverted dish-like member over said flywheel and said alternator, said cover shroud having one or more vent openings therein exhausting air, to cool said alternator, each of said openings having a width and a height extending in a plane nontangent to the periphery of the shroud.

* * * * *